United States Patent
Grove

[15] 3,660,637
[45] May 2, 1972

[54] ELECTRIC OVEN TOASTER DOOR OPERATING MECHANISM

[72] Inventor: Lawrence L. Grove, Allentown, Pa.
[73] Assignee: General Electric Company
[22] Filed: Mar. 10, 1971
[21] Appl. No.: 122,718

[52] U.S. Cl. ............................................219/413, 126/335
[51] Int. Cl. .........................................................A21b 3/02
[58] Field of Search ............219/413; 126/334, 335; 99/334, 99/335

[56] References Cited

UNITED STATES PATENTS

| | | | |
|---|---|---|---|
| 2,124,258 | 7/1938 | Moecker | 126/214 |
| 3,119,000 | 1/1964 | Loch et al. | 219/413 |
| 3,086,511 | 4/1963 | Loch | 126/335 |
| 2,707,428 | 5/1955 | Netreba | 99/334 |
| 2,244,039 | 6/1941 | Ablah | 99/335 |
| 1,623,093 | 4/1927 | Chapin et al. | 99/334 |
| 3,119,001 | 1/1964 | Andrews | 219/413 |

Primary Examiner—George Harris
Assistant Examiner—F. E. Bell
Attorney—Lawrence R. Kempton, Leonard J. Platt and John F. Cullen

[57] ABSTRACT

An electric oven toaster construction wherein a unique door holding mechanism is provided for securely holding a door in its closed position. A spring loaded bifurcated lever is moved behind an abutment for holding the door closed, and the lever is removed from the abutment when the door is moved to its opened position. The door holding mechanism may also be arranged as a door stop for permitting a toaster oven door to be automatically partially opened at the end of a cooking cycle.

6 Claims, 6 Drawing Figures

PATENTED MAY 2 1972

ELECTRIC OVEN TOASTER DOOR OPERATING MECHANISM

BACKGROUND OF THE INVENTION

This invention relates to an electric oven toaster of the type which may be used to toast bread or cook convenience foods such as frozen pizzas and TV dinners, and more particularly, to a door operating mechanism of such an oven toaster.

In a co-pending application of Paul V. Snyder, Ser. No. 90,903, filed Nov. 19, 1970, and assigned to the same assignee as the present invention, there is disclosed a mechanism for holding an electric oven toaster door partially open at the end of a cooking cycle. As shown in the co-pending patent application, the cooking chamber for the oven toaster has a front opening and the door for the front opening is pivotally mounted at the lower portion of the oven toaster so that it can be opened by moving the top portion of the door away from the oven toaster to pivot the door about its lower hinges until the door is moved to its full opened generally horizontal position. A horizontal food supporting rack is mounted in the cooking chamber and levers are fixed to the lower portion of the door for cooperating with the food supporting rack to move the rack partially out of the front opening when the door is opened. The co-pending patent application also discloses the use of a timer mechanism positioned at the side of the electric oven toaster for automatically moving the carriage forwardly at the end of a cooking cycle to partially open the oven toaster door. A spring loaded door stop mechanism is arranged in operable engagement with the carriage for preventing the door from being automatically opened beyond a predetermined position at the end of a cooking cycle while permitting the door to be manually opened against the force of the spring loaded door stop mechanism. This spring loaded door stop mechanism is strong enough to hold the door in a vertical position against the force of gravity, but weak enough to permit the door to be readily opened manually against the spring force.

By this arrangement, an oven toaster door which is pivotally mounted at its lower portion may be partially opened at the end of the cooking cycle to exhaust hot cooking air from the oven toaster to thereby terminate cooking of any food located within the toaster. However, the door is prevented from automatically falling to its full opened position at the end of the cooking cycle, to thereby prevent the door from hitting any obstruction which might be temporarily placed in front of the toaster.

This invention is concerned with such an oven toaster construction, and more particularly to a door latching or holding mechanism for securely holding a toaster oven door in its closed position.

This invention is also concerned with a door holding mechanism which may be arranged to perform the same function as the door operating mechanism disclosed in the aforementioned co-pending patent application, that is, to permit the oven toaster door to be partially opened at the end of a cooking cycle and to hold the door in its partially opened position.

Correspondingly, it is a primary object of this invention to provide a reliable and effective door operating mechanism for securely holding an oven toaster door in a closed position against the force of a spring, and it is also an object of this invention to provide such a door operating mechanism which may also be arranged to permit an automatic timing mechanism to automatically partially open the door at the end of a cooking cycle.

SUMMARY OF THE INVENTION

In accordance with one of the aspects of this invention, an electric oven toaster is provided with two generally vertical side walls, a generally horizontal top wall and a front opening. A door is pivotally mounted to the lower portion of each of the side walls for selectively closing the front opening of the oven toaster, and a carriage is operably connected to the door and is mounted for movement to open or close the door. A bifurcated lever is pivotally mounted on the carriage adjacent to an abutment stop which is fixed to the oven toaster, and a spring is fixed to one of the arms to the bifurcated lever for resiliently urging the bifurcated lever toward the carriage. A handle or other manual means is connected to the toaster oven door for permitting the door to be manually opened or closed, and the carriage, spring, bifurcated lever and abutment are uniquely positioned with respect to each other so that when the door is moved to its closed position a first arm of the bifurcated lever is moved into engagement with the abutment. Continued movement of the door to its closed position causes the carriage to pivot the bifurcated lever to remove the first arm from the abutment, and position the second arm so that it may engage the abutment. The second arm is then spring urged toward the carriage to resist subsequent movement of the door to its full open position. With this construction, the abutment may be positioned with respect to the bifurcated lever so that the spring urges the second arm of the bifurcated lever toward the carriage and continues to hold the second arm of the bifurcated lever in engagement with the abutment stop to securely hold the door in its fully closed position.

My unique door holding mechanism may also be arranged with the abutment stop spaced from both of the arms of the bifurcated lever when the door is moved to its full closed position. With this arrangement the force gravity may be utilized for holding the door in its full closed position. Accordingly, a timing device operably positioned with respect to the carriage may automatically move the carriage to partially open the door at the end of a cooking cycle, and when the door is partially opened, one of the arms of the bifurcated lever is brought into engagement with the abutment stop to hold the carriage and the door in their partially opened position.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
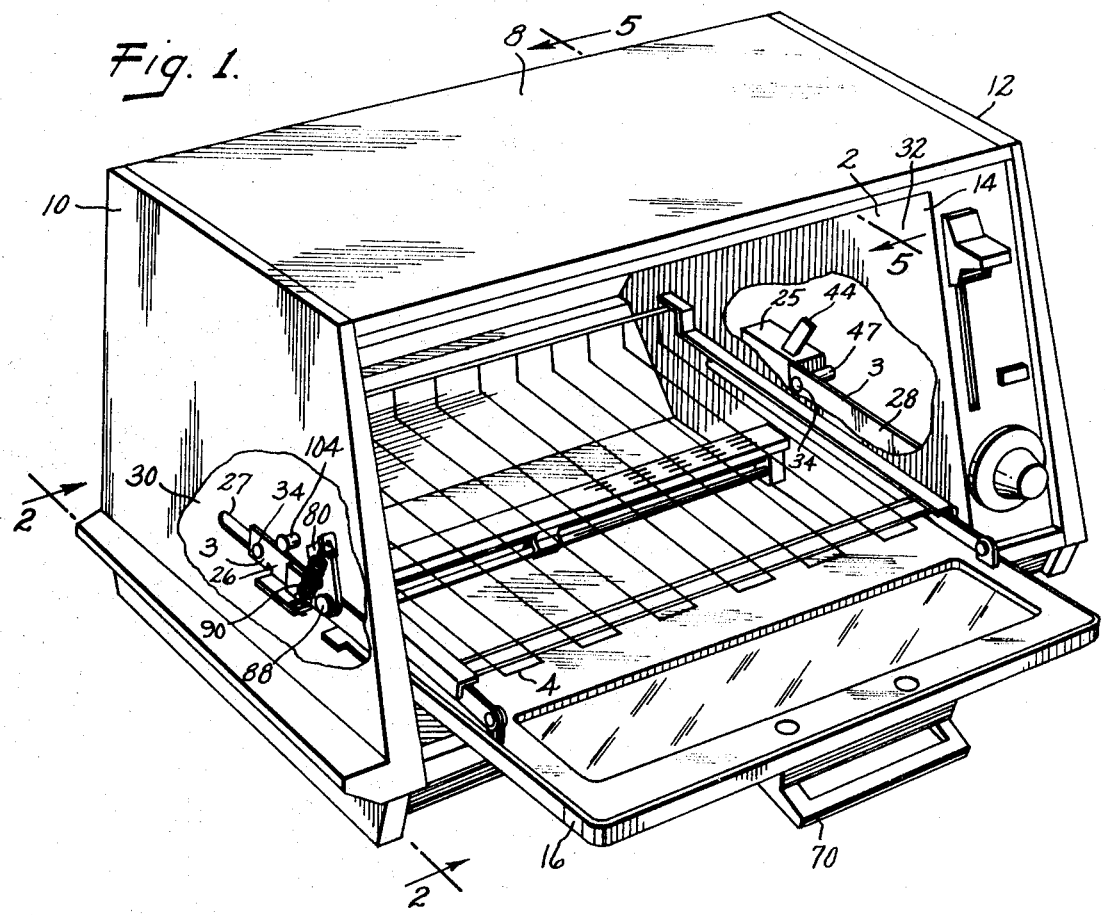
FIG. 1 is a perspective view of an electric oven toaster construction embodying my invention partially broken away to show details of construction.

Referring now to the drawing and first particularly to FIG. 1, there is shown an electric oven toaster which includes a toasting and oven chamber 2 in which is mounted a generally horizontal carriage 3 for supporting a food rack 4 for holding food to be cooked or bread to be toasted. The oven toaster includes a generally horizontal top wall 8, generally parallel vertical side walls 10 and 12, and a front opening 14 to provide access to the inside of the toaster oven.

Figure 2:
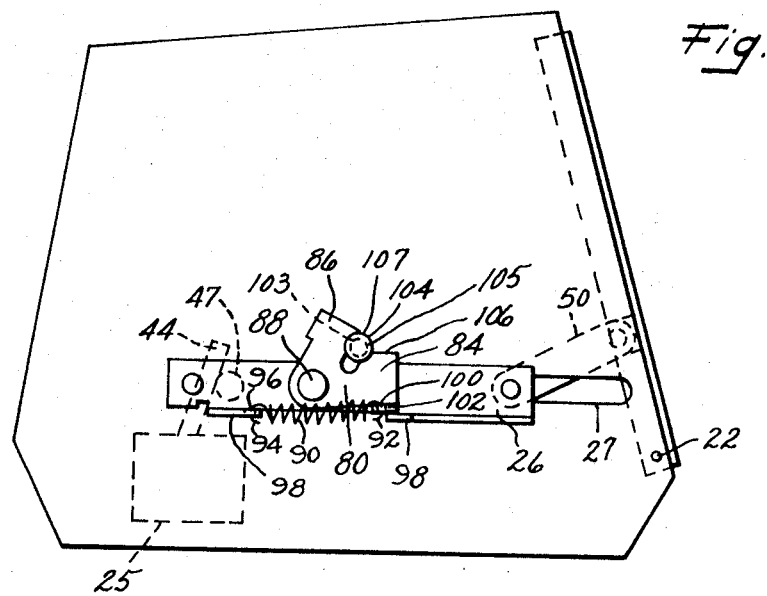
FIG. 2 is a cross-sectional view of the electric oven toaster shown in FIg. 1 taken substantially on the plane of 2—2 of FIG. 1 showing the toaster oven door in its closed position with my bifurcated lever in engagement with an abutment stop for securely holding the door in its closed position.

A front door 16 is provided for closing the front opening 14. The door 16 includes two outwardly projecting pivot pins 22 for pivoting the door to the lower portion of the toaster oven, and as shown in FIG. 1, the door 16 is in its generally horizontal full open position. As shown in FIG. 2, the front wall 20 of the toaster is slanted slightly to the rear so that the front door 16 is in a somewhat rearward vertical position when it is fully closed, the door being tilted slightly so that the top of the door is somewhat to the rear of the lower portion of the door. Thus, the force of gravity could hold the door in its closed position.

The food rack 4 is arranged to be moved partially through the front opening 14 of the toaster oven when the door is moved to its full open position as shown in FIG. 1. To achieve this in a conventional manner, the carriage 3 for supporting its food rack 4 includes two carriage links 26 and 28 which are mounted for slidable movement in a forward or rearward direction in the oven toaster. A slot 27 is formed in each of the sheet metal side plates 30 and 32 of the oven toaster, and outwardly projecting support pins 34 are inserted through the slots 27 and riveted or otherwise secured to the carriage links 26 and 28 to slidably support the carriage links 26 and 28 within the slots 27. It can be seen that each of the pins 34 includes a head portion 35 which has a diameter slightly larger than the width of the slots 27 in which the pins are positioned, and thus, after having been assembled to the carriage links 26 and 28, outward movement of the carriage links 26 and 28 is prevented by the engagement of the head portions 35 of the pins 34 with the inside walls of the panels 30 and 32 in the vicinity of slots 27 in which the pins are mounted. With particular reference to FIG. 1, it can be readily seen that the carriage links 26 and 28 have a width which is larger than the width of slots 27, and thus, the carriage links 26 and 28 are prevented from moving through the slots, and their inside surfaces are guided for slidable engagement on the outside surfaces of panels 30 and 32 in the vicinity of slots 27.

Figure 6:
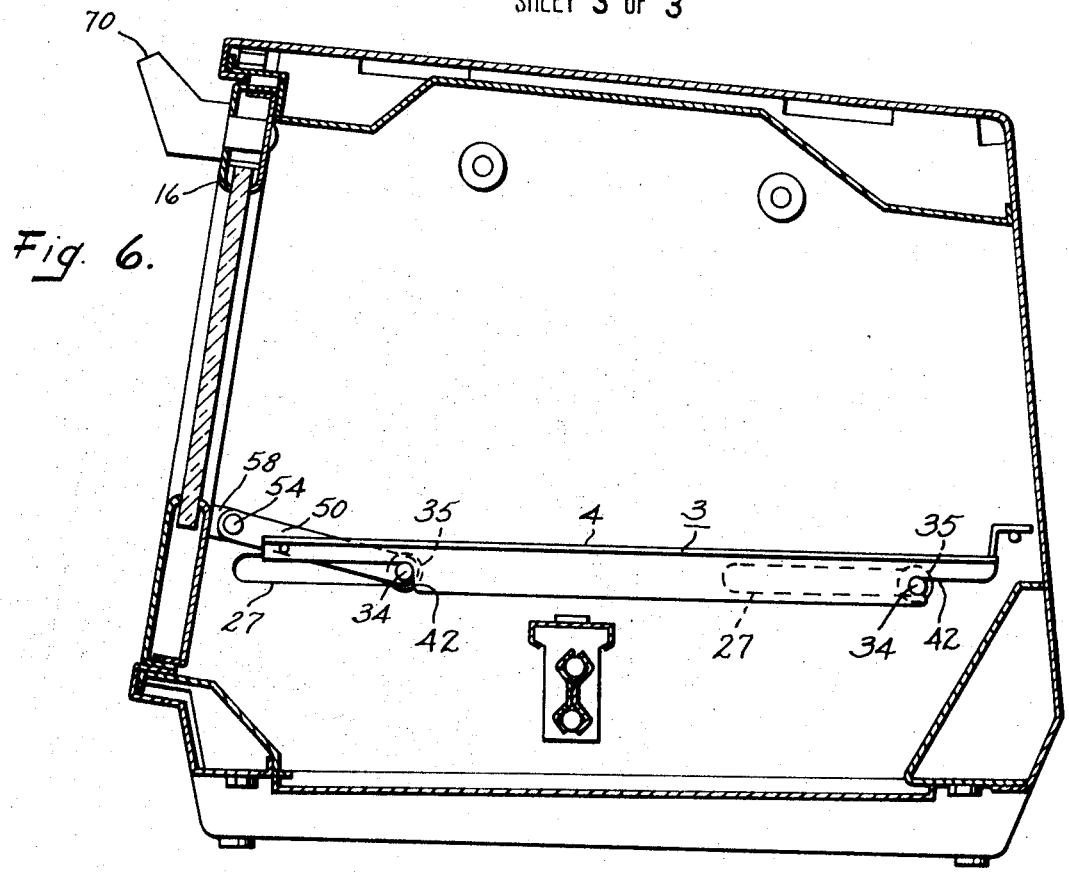
FIG. 6 is a cross-sectional view of an electric oven toaster taken substantially on the plane of 5—5 of FIG. 1.

The carriage 3 for supporting the food to be cooked or bread to be toasted includes the food rack 4 which is removably positioned on the carriage pins 34. As shown more particularly in FIGS. 1 and 6, the left and right side portions of the food rack 4 includes slots 42 for connecting the sides of the food rack to the inwardly projecting pins 34.

The front door 16 of the oven toaster is linked to the carriage 3 so that movement of the carriage 3 is in a forward direction will result in opening the front door, and correspondingly pivotal movement of the front door in a door opening direction will result in forward movement of the carriage 3 including the food rack 4 through the front opening 4 of the oven toaster. To achieve this, two door links 50 and 52 are conveniently pivoted to the front door and to forward pins 34 on the carriage links 26 and 28. Preferably, the door links are permanently pivoted to the front door by means of rivets 54 and 56 which extend through rearwardly extending tabs 58 and 60 which are formed on the front door and suitable pivot bearing apertures which are formed in the forward portions of the door links 50 and 52. The rear portions of the door links 50 and 52 are provided with enlarged pivot apertures 57 so that the door links 50 and 52 may be removably pivoted to the forward pins 34 of the carriage by simply passing the pivot apertures 57 over the respective pins 34. With this construction, it can be appreciated that when the door 16 is manually opened by pulling on its front handle 70, the door will swing downwardly, abut its pivots 22, and during this movement the door links 50 and 52 will pull outwardly on the pins 34 to slide the carriage 3 including links 26 and 28 and the food rack 4 out of the front 14 opening in the toaster. It can also be appreciated that should one or both of the carriage links 26 and 28 be moved forwardly from the closed door position illustrated in FIG. 2, such movement of the carriage links will cause the door links 50 and 52 to be pushed forwardly to open the front door 16.

The structure so far described is illustrated and described in greater detail in the above mentioned co-pending application of Paul V. Snyder, assigned to the same assignee as the present invention.

DOOR HOLDING MECHANISM

According to my invention, there is uniquely combined with the aforedescribed electric oven toaster door 16 and carriage 3 including links 26 and 28, a mechanism for securely holding the door and the carriage in their door closed position. The mechanism may also be uniquely arranged so that it will function to allow the door to be automatically opened a small amount by a timing device 25. This unique door holding mechanism includes relatively few parts which may be readily manufactured and connected to the oven toaster. As shown more particularly in FIG. 1, the door holding mechanism includes a bifurcated lever 80 which may be conveniently pivotally mounted on the left carriage link 26. The bifurcated lever includes a base portion 82 and two arms 84 and 86 which extend outwardly from the base portion. A rivet 88 or other suitable means may be provided for pivotally connecting the base portion of the bifurcated lever to the carriage link 26.

Figure 3:
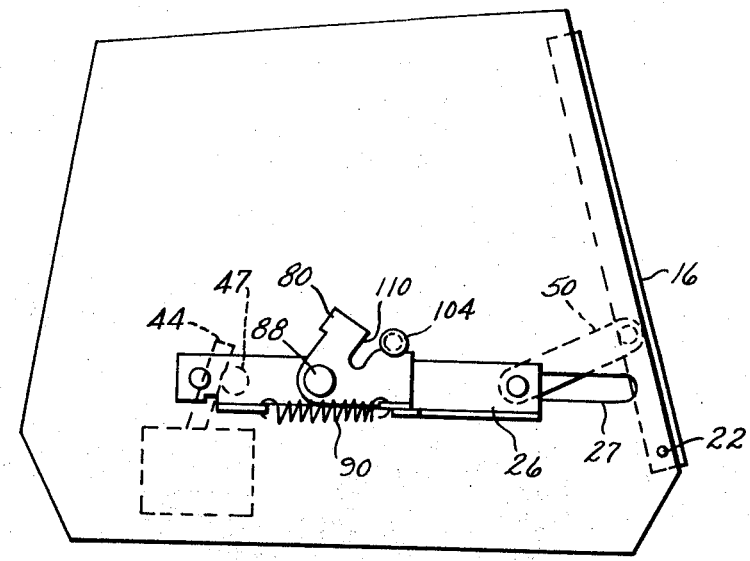
FIG. 3 is a cross-sectional view of an electric oven door similar to FIG. 2 showing the door in its closed position with my unique door holding mechanism arranged to permit the door to be moved to its partially opened position by a timing mechanism.

An overcenter snap acting spring 90 is connected to the carriage link 26 and to the bifurcated lever for overcentering the pivot 88 to snap the bifurcated lever to the position shown in FIG. 1 wherein the door is opened, or the positions shown in FIGS. 2 and 3 wherein the toaster oven door is in its closed position. To achieve this, a coil spring 90 having two end portions 92 and 94 is utilized. The end portion 94 may be conveniently inserted within an aperture 96 which may be readily stamped in an outwardly extending self 98 of link 26, and in a similar manner the other end 92 of the spring 90 may be inserted within an aperture 100 which may be conveniently formed in an outwardly extending tab 102 of arm 84 of the bifurcated member. With this arrangement, in the position illustrated in FIG. 1, the spring 90 resiliently urges arm 86 of the bifurcated member into engagement with the upper portion of shelf 98 of the carriage link, and in the other two positions of the bifurcated lever as shown in FIGS. 2 and 3, the spring urges the arm 84 of the bifurcated lever toward the outwardly extending shelf 98 of the carriage link. In the position illustrated in FIG. 3, the tab 100 of arm 84 is placed in contact with the upper surface of shelf 98 of link 26, and in the position illustrated in FIG. 2 the tab 100 is positioned a short distance above the shelf 98 since the arm 86 is in engagement with an abutment stop 104 and the carriage link 26 has reached the end of its travel in a door closing direction within slot 27.

In the arrangement of the parts illustrated in FIGS. 1 and 2, the abutment stop 104 is uniquely positioned to hold the carriage and the door in the door closed position, and thus, the door holding mechanism functions as a door latch. With particular reference to FIG. 2, it can be appreciated that in this position the spring 90 is exerting clockwise torque on arm 84 of the bifurcated lever. The arm 86 of the lever is being moved clockwise against the abutment stop 104 tending to cause the pivot 88 to be driven rearwardly or to the left as shown in FIG. 2. In addition, in this position the door links 50 connected to the left carriage link 26 are pulled to the rear and the door 16 is pulled to a tightly closed position under the force of the spring 90.

With the arrangement of the abutment stop 104 and the bifurcated lever 84 and 86 in the positions illustrated in FIGS. 1 and 2, as the oven door 16 is manually opened by gripping handle 70, the door links 50 and carriage links 26 and 28 are pulled to the right as shown in FIGS. 1 and 2, and the arm 86 resists this motion with a clockwise torque until the spring overcenters or moves beyond the axis of pivot pin 88. With this occurs, the inner surface 106 of arm 1 is forced into engagement with the right side of the abutment stop 104, and the carriage link 26 is driven to the right under the force of spring 90 and the bifurcated lever 84 and 86. Thus, opening of the oven door is assisted by the bifurcated lever and spring 90 until the surface 106 breaks contact with the abutment 104 as the carriage link 26 and the bifurcated lever continues to move to the right as shown in FIG. 1.

DOOR HOLDING MECHANISM AS DOOR STOP TO HOLD DOOR IN PARTIALLY OPENED POSITION

My unique door holding mechanism may also be arranged with respect to its abutment 104 to hold the door 16 in a partially opened position after it has been opened by a timing mechanism at the end of a cooking cycle.

As shown more particularly in FIG. 1, a timer 25 may be provided for cooperating with carriage link 28 in order to open the front door 16 at a predetermined time at the end of cooking cycle. The timer 25 may include any suitable form of electric toaster timer which includes an output shaft or lever 44 which may be automatically moved from a closed door position a short distance to an open door position at the end of a cooking cycle. In order to enable the output lever 44 of the timer to move the carriage link 28 forwardly at the end of a cooking cycle, an abutment 47 may be riveted or otherwise suitably connected to the carrier link 28. As shown more particularly in FIG. 3, the abutment 27 on the carriage link 28 is positioned somewhat forwardly of the upwardly extending lever 44 of the timer so that the forward surface of the timer lever 44 will engage the rear surface of the abutment member 47 when the timer lever 44 is moved from its closed door position to its open door position. With this construction, it can be appreciated that at the end of the toasting or cooking time interval the timer lever 44 moves forwardly to move the carriage link 28 and the carriage 3 forwardly. Naturally, this forward movement of the carriage pushes the door links 50 and 52 forwardly to move the door over is vertical position on pivot pins 22 to open the door at the end of a cooking cycle to thereby exhaust hot cooking air from the toaster to thereby terminate cooking of any food located within the toaster.

In accordance with my invention, my unique door holding mechanism may function as a door stop for holding the oven door in a partially opened position at the end of a cooking cycle. This is accomplished by simply fixing the abutment stop 104 to the toaster side plate about a one-half inch forwardly from the position illustrated in FIGS. 1 and 2 to the position illustrated in FIGS. 3, 4 and 5. With this arrangement, it can be seen that when the door is in its fully closed position as illustrated in FIG. 3, the abutment stop 104 is spaced about a one-half inch from a forward surface 110 of arm 86 of bifurcated lever 80 and the abutment stop 104 is also positioned above arm 84 of the bifurcated lever. With this arrangement, a lost motion between the abutment stop 104 and the surface 110 of the bifurcated lever is provided when the door is moved from its closed position illustrated in FIG. 3 to its partially opened position illustrated in FIG. 4. Accordingly, when the timer 25 partially opens the door and the door starts to fall to its open position under the force of gravity, the abutment surface 110 of the bifurcated lever will contact the left surface of the abutment stop 104 to prevent any further automatic movement of the door in a door opening direction. Thus, in accordance with my invention, the unique bifurcated lever arrangement is designed to function as a door stop to hold the door in its partially opened position, and the spring 90 is arranged to be strong enough so that it will hold the door in a partially opened position illustrated in FIG. 4 after it has been opened by the timer 25.

Figure 5:
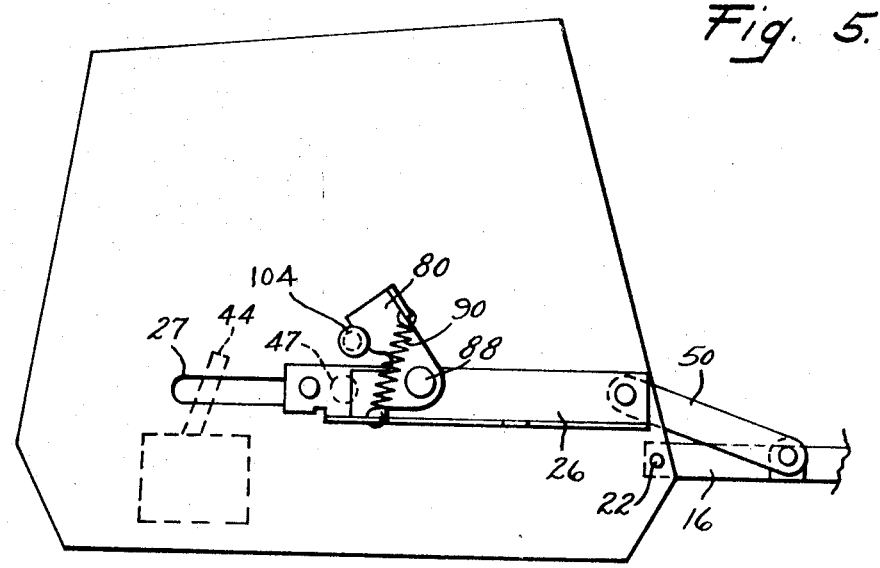
FIG. 5 is a cross-section view of an electric oven toaster similar to FIG. 3 showing the toaster oven door in its fully opened position.

The spring 90 is also designed to be weak enough so that the door may be manually opened at any time by exerting a slight force on handle 70. It can be seen that upon the application of manual force in a door opening direction the door links 50 and 52 will pull the carriage 3 forwardly to force the arm 86 of the bifurcated lever against the abutment stop 104 and continued movement will rotate the bifurcated lever 82 counterclockwise about its pivot pin 88 until the spring 90 overcenters the pivot 88. At this time the spring will force the surface 106 of the bifurcated lever into engagement with the abutment stop 104 to move the carriage link 26 forwardly to thereby move the door link forwardly to open the door 16. Opening of the oven door is assisted by the bifurcated member until the full opened position of the door is achieved as shown in FIG. 5. In this position, it can be seen that the surface 106 of the bifurcated lever is in contact with the abutment stop 104 so that the bifurcated lever and spring tend to hold the door in its full opened position.

Figure 4:
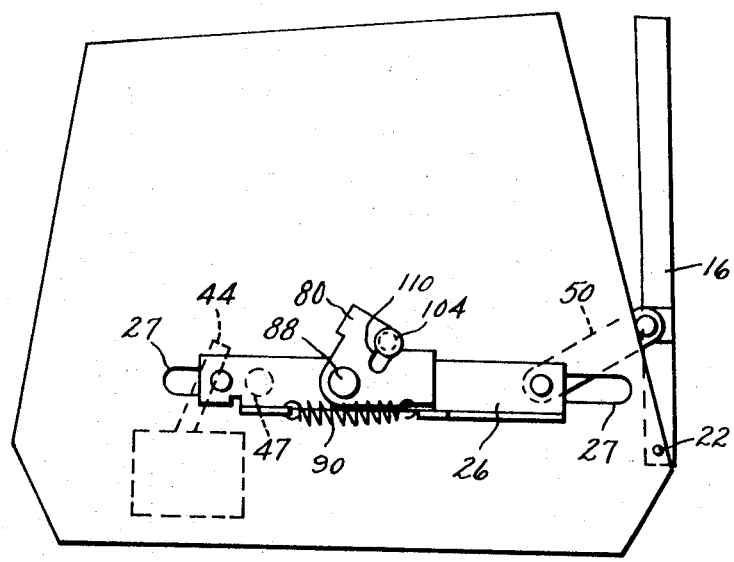
FIG. 4 is a cross-sectional view of an electric oven toaster similar to FIG. 3 showing the oven toaster door in its partially opened position.

When the oven door is closed by manually moving it from the position illustrated in FIG. 5 to the position illustrated in FIG. 3, the door links 50 push the carriage link 26 rearwardly to cause the bifurcated lever 82 to pivot clockwise about its pivot 88, and when the spring 90 overcenters the pivot, the door is snapped toward its fully closed position illustrated in FIG. 3 under the influence of spring 90 and as the door is manually moved from its partially opened position illustrated in FIG. 4 to its fully closed position illustrated in FIG. 3, the surface 110 of bifurcated lever 80 breaks contact with the abutment stop 104.

As shown more particularly in FIGS. 2, and 3, the door abutment 104 may be provided with a pin and roller assembly in order to provide a low friction abutment as the arms of the bifurcated lever are moved against the abutment. As shown, a pin 103 having a head portion 105 is riveted to the side plate 30 of the oven toaster, and a roller member 107 is sandwiched for rotary movement on the pin between the inside surface of the head 105 and the inside wall of plate 30. With this arrangement, when the arms of the bifurcated lever 82 are moved into engagement with the roller portion 107 of the abutment stop, the roller simply slides on the pin 103 to achieve a relatively low friction assembly.

From the foregoing description, it will be appreciated that my unique door holding mechanism may be arranged to function either as a door latch for holding a door in its fully closed position as shown in FIGS. 1 and 2, or as a door stop for holding a door in its partially opened position after it has been opened by a timer mechanism 25, as shown in FIGS. 3, 4 and 5. All that is necessary to achieve this optional difference in operation is movement of the abutment stop 104 from the position illustrated in FIGS. 1 and 2 to the position illustrated in FIGS. 3, 4 and 5. The unique door latching or door stop mechanism includes a minimum member of readily manufactured parts which may be easily assembled into a toaster oven. Only four principle parts are required; a bifurcated lever 80, a spring 90, a pivot pin 88, and a door abutment 104.

What I claim is:

1. An electric oven toaster construction having two generally vertical side walls, a generally horizontal top wall and a front opening comprising:
   a. a door pivotally mounted to the lower portion of each of the side walls for selectively opening or closing the front opening of the oven toaster;
   b. a carriage operably connected to said door and mounted for movement to open or close the door;
   c. a bifurcated lever having two arms pivotally mounted on said carriage for holding said carriage and door;
   d. a spring having two end portions, one of the end portions of said spring being connected to said carriage and the other end portion of said spring being connected to a first arm of said bifurcated lever for resiliently urging said bifurcated lever toward said carriage;
   e. an abutment stop position adjacent to the arms of said bifurcated lever; and
   f. manual means connected to the door for permitting the door to be manually opened and closed, the first arm of said bifurcated lever being moved into engagement with said abutment when the door is moved toward its closed position and continued movement of the door causing said carriage to pivot said bifurcated lever to remove the first arm of said bifurcated lever from said abutment as the door is moved to its closed position, the second arm then being spring urged toward said carriage to resist subsequent movement of the door to its full open position.

2. An electric oven toaster construction as defined in claim 1 wherein the second arm of said bifurcated lever is in engagement with said abutment stop and said spring exerts a resiliently force on said first arm to resiliently hold the second arm in engagement with the abutment stop to thereby securely hold the carriage and the door in their door closed position.

3. An electric oven toaster construction as defined in claim wherein said abutment stop is spaced from said second arm of said bifurcated lever when the door is in its fully closed position and a timing device operably positioned with respect to the carriage may automatically move the carriage until the second arm of the bifurcated lever is brought into engagement with the abutment stop whereby the bifurcated lever and the abutment stop hold the carriage and the door in their partially opened position.

4. An electric oven toaster construction having two generally vertical side walls, a generally horizontal top wall and a front opening comprising:
   a. a door pivotally mounted to the lower portion of each of the side walls for selectively opening or closing the front opening of the oven toaster;
   b. a carriage operably connected to said door and mounted for movement to open or close the door;
   c. a bifurcated lever having a base portion and two arms extending outwardly from the base portion at an angle with respect to each other;
   d. a pivot means extending through said base portion for pivotally connecting said bifurcated lever to said carriage;
   e. a spring having two end portions, one of the end portions of said spring being connected to said carriage in the vicinity of said pivot means, and the other end portion of said spring being connected to a first arm of said bifurcated lever for resiliently urging said first arm of said bifurcated lever toward said carriage;
   f. said spring being positioned with respect to said bifurcated lever so that as the first arm of the bifurcated lever is moved away from the carriage the spring passes through the axis of said pivot to cause said spring to resiliently urge the other arm of said bifurcated lever toward said carriage; and
   g. an abutment stop positioned adjacent to the arms of said bifurcated lever so that when the door is manually closed the carriage and the pivotally mounted bifurcated lever are moved as a unit to cause the first arm of the bifurcated lever to engage said abutment, continued movement in a door closing direction causing said spring to overcenter said pivot axis so that the spring causes the second arm of the bifurcated lever to engage the abutment stop to snap the door to its door closed position, the spring continuing to exert a force on the second arm of the bifurcated lever to hold the second arm in engagement with the abutment stop to thereby hold the door in its door closed position.

5. An electric oven toaster construction as defined in claim 1 wherein an outwardly extending tab is formed on the first arm of said bifurcated lever and one of the end portions of said spring is connected to said outwardly extending tab.

6. An electric oven toaster construction as defined in claim 1 wherein said abutment stop includes a pin having a head portion fixed to one of the vertical side walls of the oven toaster and a roller rotatably mounted on the pin sandwiched between the head of the pin and the side wall for achieving a relatively low friction abutment for the bifurcated lever.

* * * * *